(12) United States Patent
Fukasawa et al.

(10) Patent No.: US 11,118,969 B2
(45) Date of Patent: Sep. 14, 2021

(54) ELECTRON TUBE COMPRISING A FOCUSING ELECTRODE PART HAVING A LIGHT PASSAGE PORTION AND AN ELECTRON PASSAGE PORTION

(71) Applicant: HAMAMATSU PHOTONICS K.K., Hamamatsu (JP)

(72) Inventors: Atsuhito Fukasawa, Hamamatsu (JP); Yasuyuki Egawa, Hamamatsu (JP); Shigeru Ichikawa, Hamamatsu (JP); Yasuharu Negi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 65 days.

(21) Appl. No.: 16/628,350

(22) PCT Filed: Jun. 15, 2018

(86) PCT No.: PCT/JP2018/022948
§ 371 (c)(1),
(2) Date: Jan. 3, 2020

(87) PCT Pub. No.: WO2019/012914
PCT Pub. Date: Jan. 17, 2019

(65) Prior Publication Data
US 2020/0149959 A1    May 14, 2020

(30) Foreign Application Priority Data

Jul. 12, 2017    (JP) .............................. JP2017-136313

(51) Int. Cl.
*H01J 40/04*    (2006.01)
*G01J 1/44*    (2006.01)

(52) U.S. Cl.
CPC .......... *G01J 1/44* (2013.01); *G01J 2001/4466* (2013.01)

(58) Field of Classification Search
CPC .. H01J 40/04; H01J 31/26; H01J 40/06; G01J 1/44; G01J 2001/4466
(Continued)

(56) References Cited

U.S. PATENT DOCUMENTS 3,885,178 A    5/1975  Goehner
4,825,066 A *  4/1989  Nakamura .............. H01J 43/06
                                                        250/207
(Continued)

FOREIGN PATENT DOCUMENTS

JP    H06-243795 A    9/1994
JP    H10-172503 A    6/1998
(Continued)

OTHER PUBLICATIONS

International Preliminary Report on Patentability dated Jan. 23, 2020 for PCT/JP2018/022948.

*Primary Examiner* — Que Tan Le
(74) *Attorney, Agent, or Firm* — Faegre Drinker Biddle & Reath LLP

(57) ABSTRACT

An electron tube includes a photoelectric surface, an avalanche photodiode, a focusing electrode part that accelerates and focuses the electrons E from the photoelectric surface toward the avalanche photodiode, and a casing including a stem provided with the avalanche photodiode. The stem is provided with a light incident hole through which the light is transmitted, and the periphery of the light incident hole is light-shielded by the stem. The focusing electrode part includes a first region provided with a light passage hole, and a second region provided with an electron passage hole that guides the electrons to the avalanche photodiode. The first region is formed on an axial line that connects the light incident hole and the photoelectric surface. The second
(Continued)

region is formed on an axial line that connects the photoelectric surface and the avalanche photodiode.

7 Claims, 10 Drawing Sheets

(58) Field of Classification Search
USPC .......................................... 250/207, 214 VT
See application file for complete search history.

(56) References Cited

U.S. PATENT DOCUMENTS

| 5,982,094 A | 11/1999 | Niigaki et al. |
| 6,674,063 B2 | 1/2004 | Ferenc |
| 2004/0051046 A1 | 3/2004 | Ferenc |
| 2012/0314827 A1 | 12/2012 | Dioszegi et al. |

FOREIGN PATENT DOCUMENTS

| JP | 2005-339844 A | 12/2005 |
| JP | 2007-80799 A | 3/2007 |
| JP | 2010-257962 A | 11/2010 |
| JP | 4832898 B2 | 12/2011 |
| WO | WO-2005/078759 A1 | 8/2005 |
| WO | WO-2007/129492 A1 | 11/2007 |

* cited by examiner

ELECTRON TUBE COMPRISING A FOCUSING ELECTRODE PART HAVING A LIGHT PASSAGE PORTION AND AN ELECTRON PASSAGE PORTION

TECHNICAL FIELD

An embodiment of the present relates to an electron tube.

BACKGROUND ART

An electron tube for detecting light accelerates electrons (photoelectrons) emitted from a photoelectric surface on incidence of light toward a semiconductor element, and captures the electrons by the semiconductor element. For example, an electron tube disclosed in Patent Literature 1 receives light from an incident window provided in one end of a chamber. When the received light is incident to a photoelectric conversion part provided at the other end that faces the incident window, the photoelectric conversion part generates electrons (photoelectrons). The electrons are incident to a sensor that is provided in the incident window to face the photoelectric conversion part.

CITATION LIST

Patent Literature

Patent Literature 1: U.S. Pat. No. 6,674,063

SUMMARY OF INVENTION

Technical Problem

Patent Literature 1 discloses an electron implantation and multiplication type optical sensor of a reflection type in which an entire surface of a stem provided with the electron detection element is set as the incident window. In the electron tube disclosed in Patent Literature 1, light received from the incident window may be directly incident to the photoelectric surface in accordance with a light incident aspect. In addition, light may be incident to an inner wall of the chamber. However, even in a case where light is incident to the inner wall of the chamber, since a reflective surface is provided on the inner wall of the chamber, the light incident to the inner wall of the chamber is reflected by the reflective surface and is incident to the photoelectric surface. Accordingly, a distance from the incident window to the photoelectric surface may vary due to the light incident aspect. In the optical sensor disclosed in Patent Literature 1, the entire surface of the stem is the incident window. Accordingly, the incident light may have various routes. As a result, in a case where a component article is disposed between the stem and the photoelectric surface, there is a possibility that light is shielded by the component article. Accordingly, it is difficult to provide a focusing electrode between the electron detection element provided in the stem and the photoelectric surface. As a result, a signal output from the electron detection element fluctuates in time in correspondence with an aspect of incident light. Accordingly, it is difficult to reliably obtain desired temporal characteristics.

An object of an embodiment of the invention is to provide an electron tube capable of reliably obtaining desired temporal characteristics.

Solution to Problem

An electron tube according to an aspect of the invention includes: a photoelectric conversion part that emits electrons corresponding to incident light; an electron detection part that is disposed to face the photoelectric conversion part, and receives the electrons; a focusing electrode part that includes an electrode plate disposed between the photoelectric conversion part and the electron detection part, and accelerates and focuses the electrons from the photoelectric conversion part toward the electron detection part; and a casing that includes a stem part provided with the electron detection part, and forms an internal space in which the photoelectric conversion part and the electron detection part are disposed and which is maintained in a vacuum. The stem part is provided with a light incident window portion through which the light is transmitted, and includes a light-shielding part that light-shields the periphery of the light incident window portion. The electrode plate includes a first region provided with a light passage portion that guides the light to the photoelectric conversion part by allowing the light guided from the light incident window portion to be transmitted, and a second region provided with an electron passage portion that guides the electrons to the electron detection part by allowing the electrons emitted from the photoelectric conversion part to be transmitted. The first region is formed on a first axial line that connects the light incident window portion and the photoelectric conversion part. The second region is formed on a second axial line that connects the photoelectric conversion part and the electron detection part.

Light is received into the casing from the light incident window which is provided in the stem part and of which the periphery is light-shielded. The light received into the casing passes through the light passage portion of the electrode plate. The light that has passed through the light passage portion reaches the photoelectric conversion part. That is, incidence of light in the stern part is limited to incidence through the light incident window portion. Light that has passed through the light incident window portion passes through the light passage portion. Accordingly, it is necessary for the light that finally reaches the photoelectric conversion part to pass through the light passage portion. In this case, an aspect of the light until reaching the photoelectric conversion part after being incident from the stern part including the light incident window portion is limited to an aspect of passing through the incident window portion and the light passage portion. As a result, a deviation of an incident route is suppressed. Accordingly, a distance until reaching the photoelectric conversion surface from the light incident window portion is in a predetermined range. The electrons emitted from the photoelectric conversion part are focused by the focusing electrode part. The focused electrons are guided to the electron detection part. Accordingly, temporal fluctuation of a signal output from the electron detection part is reduced, and thus it is possible to reliably obtain desired temporal characteristics.

The light passage portion may be spaced away from the electron passage portion. According to this configuration, it is possible to reduce an influence on an electric field formed in the electron passage portion by the light passage portion. Accordingly, a desired electron trajectory is obtained. In addition, it is possible to reliably specify an incident route of light that reaches the photoelectric conversion part.

The casing further may include a lid part that faces the stem part, and the lid part may include the photoelectric conversion part that is provided on a surface that faces the stem part and is exposed to the internal space. According to this configuration, it is possible to provide the photoelectric conversion unit with accuracy. Accordingly, it is possible to obtain a desired electron trajectory.

The light incident window portion may include a through-hole that is provided in the stem part in which the first axial line is set as a central axial line, and a light-transmitting member that is fixed to the stem part to close the through-hole. According to this configuration, it is possible to reliably specify the incident route of the light that reaches the photoelectric conversion part.

The light-transmitting member may include a light incident surface to which the light is incident, and the light incident surface may be orthogonal to the first axial line. According to this configuration, it is possible to efficiently guide incident light to the photoelectric conversion unit.

The stem part may be formed from a metal material. According to this configuration, the stem part can function as a light-shielding part. Accordingly, it is possible to reliably specify the incident route of the light that reaches the photoelectric conversion part. In addition, the stem part formed from a metal material has satisfactory heat conductivity. Accordingly, heat generated in the electron detection part is efficiently discharged to the outside. As a result, it is possible to stabilize an operation of the electron detection part.

The lid part may be formed from a metal material. According to this configuration, the lid part has a light-shielding property. Accordingly, it is possible to suppress incident of noise light from the lid part.

Advantageous Effects of Invention

According to the embodiment of the invention, there is provided an electron tube capable of reliably obtaining desired temporal characteristics.

DESCRIPTION OF EMBODIMENTS

Figure 1:
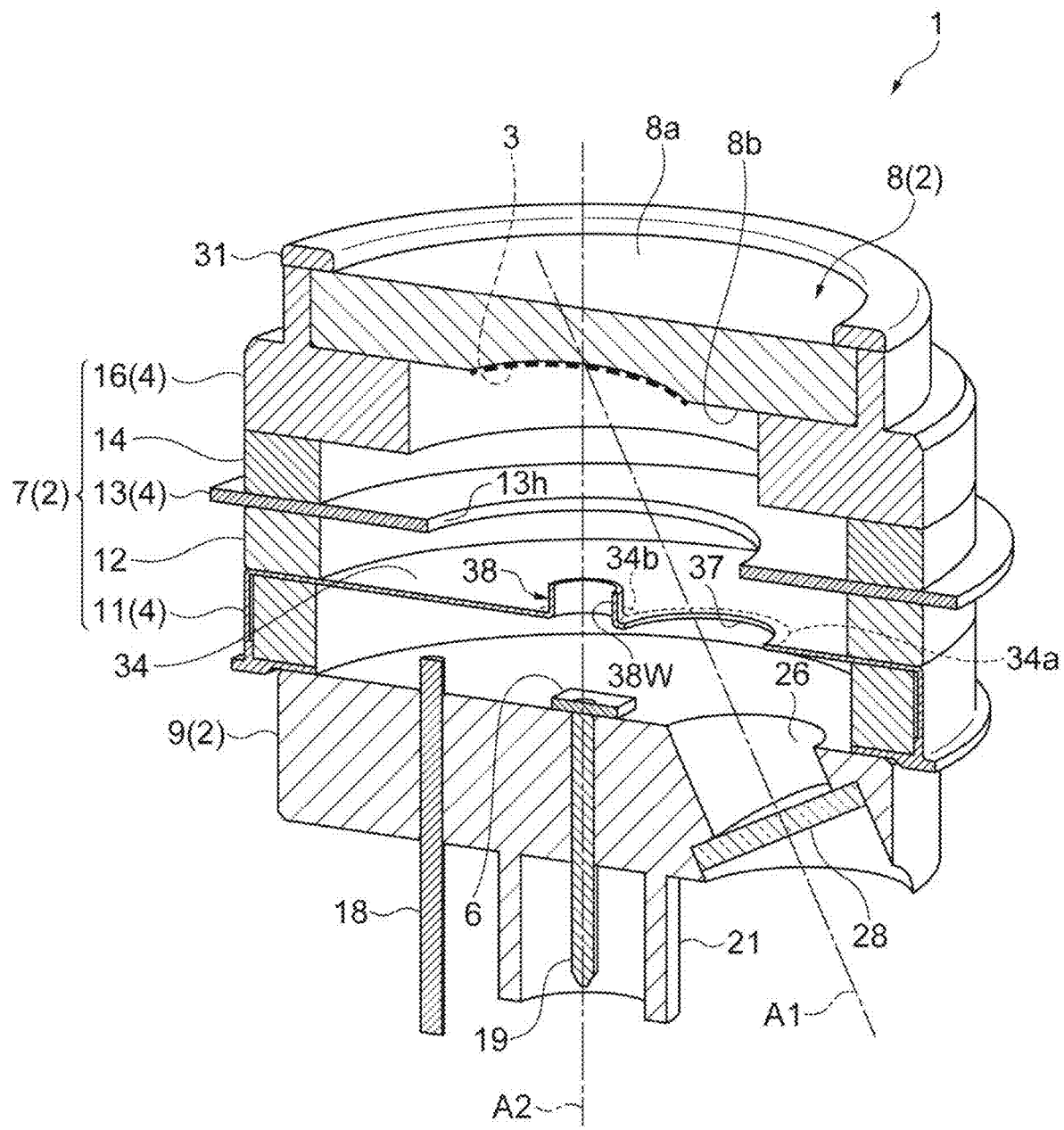
FIG. 1 is a perspective view illustrating a cross-section of an electron tube according to an embodiment.

Hereinafter, an embodiment for carrying out the invention will be described in detail with reference to the attached drawings. In description of the drawings, the same reference numeral will be given the same element, and redundant description will be omitted.

An electron tube 1 illustrated in FIG. 1 is a so-called electron implantation and multiplication type optical sensor (hybrid photo-detector (HPD)). The electron tube 1 accelerates electrons (photoelectrons) emitted from a photoelectric surface on incidence of light. The electron tube 1 causes the accelerated electrons to be incident to an avalanche photodiode that is a semiconductor element. According to this configuration, the electron tube 1 detects weak light. The avalanche photodiode is a semiconductor element in which a high-concentration P region and a high-concentration N region are joined to each other, and which Runs a sufficiently high electric field to cause avalanche amplification in a joint region. When electrons are incident to an incident surface of the avalanche photodiode, the avalanche photodiode multiplies the incident electrons and outputs an electric signal. Accordingly, the avalanche photodiode is an electron multiplication part. In addition, the avalanche photodiode is also an electron detection part.

The electron tube 1 includes a casing 2 that forms an internal space maintained in a vacuum. The casing 2 shows an approximately cylindrical shape. A photoelectric surface 3 (photoelectric conversion part) a focusing electrode part 4, and an avalanche photodiode 6 (electron detection part) are disposed inside the casing 2.

As an example, the cylindrical casing 2 has an outer diameter of approximately 30 mm and a height of approximately 25 mm. The casing 2 includes a side tube part 7, a lid 8 (lid part), a stem 9 (stem part) which are disposed along an axial line A2 (second axial line).

The side tube part 7 constitutes a main body part of the cylindrical casing 2. An upper end and a lower end of the side tube part 7 are opened. The opened upper end is sealed by the lid 8. The opened lower end is sealed by the stem 9. In a connection site between the lid 8 and the side tube part 7 and a connection site between the stem 9 and the side tube part 7, air-tightness is maintained. The inside of the casing 2 is maintained in a vacuum.

The side tube part 7 includes a lower electrode part 11, a lower insulating tube part 12, an intermediate electrode part 13, an upper insulating tube part 14, and an upper electrode part 16. The lower electrode part 11, the lower insulating tube part 12, the intermediate electrode part 13, the upper insulating tube part 14, and the upper electrode part 16 have an approximately annular shape. The lower electrode part 11, the lower insulating tube part 12, the intermediate electrode part 13, the upper insulating tube part 14, and the upper electrode part 16 are laminated in this order from a lower side along the axial line A2. At least a part of the lower electrode part 11, the intermediate electrode part 13, and the upper electrode part 16 as the focusing electrode part 4 constitutes a part of the casing 2. The upper electrode part 16 forms an upper end opening of the side tube part 7. The upper electrode part 16 functions as the focusing electrode part 4 that is closest to the photoelectric surface 3. The lower electrode part 11 forms a lower end opening of the side tube part 7. The lower electrode part 11 functions as the focusing electrode part 4 that is closest to the avalanche photodiode 6. Details of a configuration of the side tube part 7 will be described later.

The lid 8 closes an opening of the upper electrode part 16. The lid 8 is a disc-shaped member that is formed from a conductive member (for example, a metal material such as Kovar) having a light-shielding property. The lid 8 includes a lid upper surface 8a and a lid lower surface 8b. The lid upper surface 8a is exposed to the outside of the casing 2. The lid lower surface 8b is exposed to the inside of the casing 2. An axial line of the lid 8 overlaps the axial line A2 of the casing 2. The photoelectric surface 3 is formed in a region that overlaps the axial line A2 on the lid lower surface 8b of the lid 8. The photoelectric surface 3 is a film-shaped portion that is formed on a concave curved surface recessed toward the lid upper surface 8a side. For example, the photoelectric surface 3 is an alkali photoelectric surface formed from Sb—K—Cs or the like. As a photoelectric surface material, a crystalline photoelectric surface material such as GaAsP may be employed. The lid upper surface 8a is air-tightly fixed to the upper electrode part 16 by a sealing part 31. As the sealing part 31, Kovar is exemplified. The sealing part 31 is air-tightly fixed by interposing a joining member (not illustrated) (for example, a joining member including a low-melting-point metal such as indium) between the lid upper surface 8a and the upper electrode part 16. The lid 8 is disposed on the axial line A2. The stem 9 is disposed on the axial line A2. Accordingly, the lid lower surface 8b of the lid 8 faces the stem 9. The lid 8 is constituted by a conductive member having a light-shielding property. Accordingly, incidence of noise light to the photoelectric surface 3 from the lid 8 side is suppressed. In addition, it is possible to supply a potential to the photoelectric surface 3 through the lid 8 and the upper electrode part 16.

Figure 2:
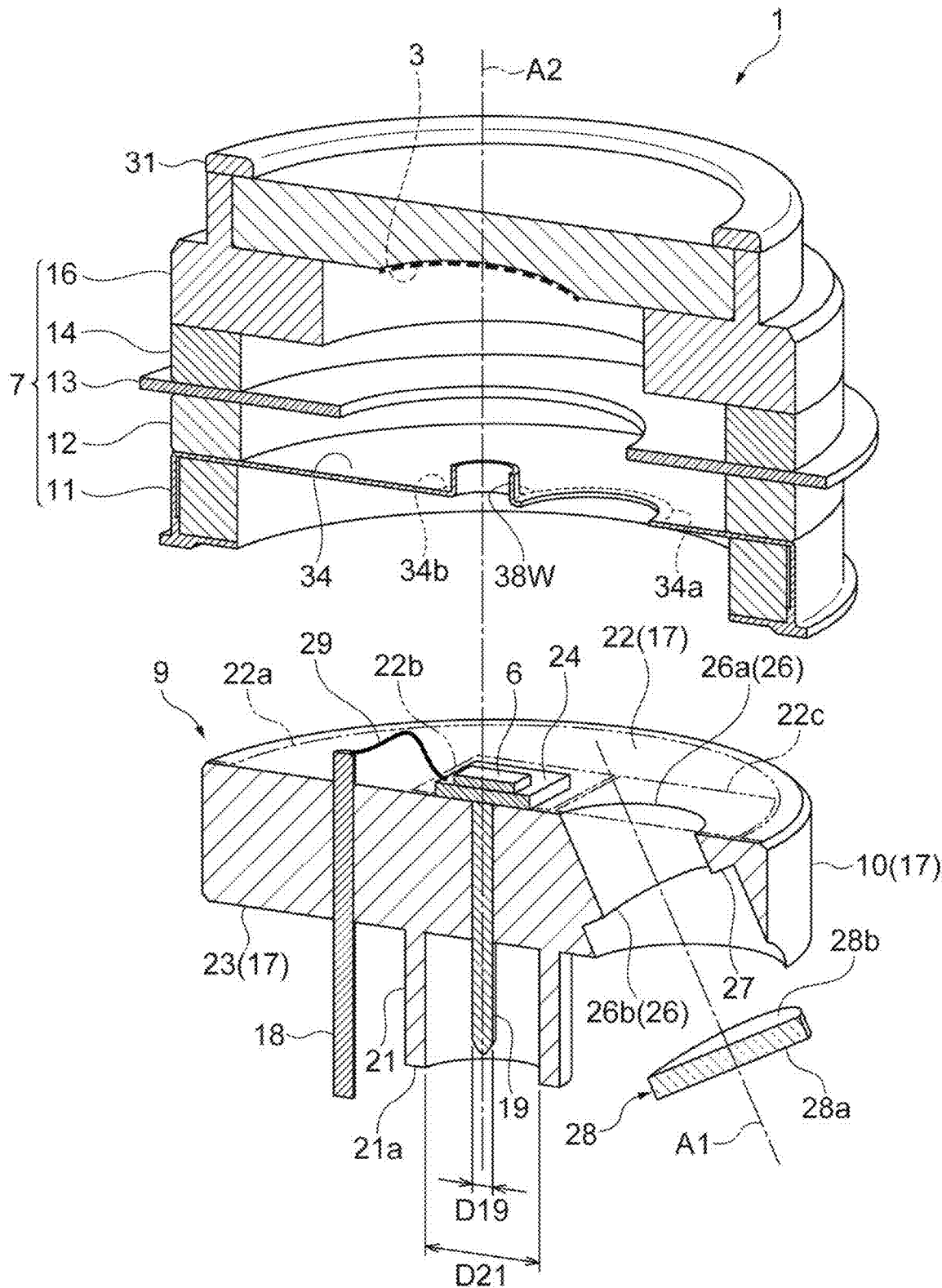
FIG. 2 is a perspective view illustrating a cross-section of a stem part illustrated in FIG. 1.

As illustrated in FIG. 2, the stem 9 includes a base 17, a power supply pin 18, a signal pin 19, and a pin protecting tube part 21. The base 17 having a disc shape includes a base main surface 22 and a base rear surface 23. The base main surface 22 is exposed to an inner side of the casing 2. The base rear surface 23 is exposed to an outer side of the casing 2. The base main surface 22 includes a connection region 22a, a diode disposing region 22b, and a through-hole formed region 22c. The connection region 22a is set to a peripheral edge part of the base main surface 22. The connection region 22a is air-tightly fixed to the lower electrode part 11. The diode disposing region 22b is set to a central portion including a central axial line of the base main surface 22. The avalanche photodiode 6 is attached to the diode disposing region 22b. Specifically, a substrate 24 is fixed onto the base main surface 22. In addition, the avalanche photodiode 6 is attached to the substrate 24. The avalanche photodiode 6 is attached to the stem 9 through the substrate 24. The avalanche photodiode 6 is disposed to intersect the axial line A2. The photoelectric surface 3 is also disposed to intersect the axial line A2. Accordingly, the avalanche photodiode 6 faces the photoelectric surface 3. There is a possibility that heat generation during an operation of the avalanche photodiode 6 becomes a noise component. Accordingly, heat generated by the avalanche photodiode 6 may be dissipated through the stem 9. Accordingly, examples of a material of the stem 9 include copper that is a metal material having a high heat dissipation property. In addition, as the material of the stem 9, a metal material such as Kovar and/or ceramic, and the like may be employed.

The through-hole formed region 22c is set to between the connection region 22a and the diode disposing region 22b. An inner opening 26a on one side of a light incident hole 26 (light incident window portion) is formed in the through-hole formed region 22c. Light is received to the inside of the casing 2 due to the light incident hole 26. The light incident hole 26 passes through the base 17. An axial line A1 (first axial line) that is a central axis of the light incident hole 26 is an optical axis of light incident to the casing 2. The axial line A1 passes through the center of the photoelectric surface 3. The axial line A1 is inclined with respect to the axial line A2 of the casing 2.

The inner opening 26a of the light incident hole 26 is formed in the through-hole formed region 22c of the base main surface 22. A counter bore 27 is formed in the base rear surface 23 of the light incident hole 26. An outer opening 26b of the light incident hole 26 is formed in the counter bore 27. An incident surface plate 28 (light-transmitting member) is inserted into the light incident hole 26 to air-tightly sealing the outer opening 26b. The incident surface plate 28 is transparent glass that is transparent with respect to light. Specifically, the incident surface plate 28 may be sapphire glass. A material of the incident surface plate 28 may be selected in correspondence with a wavelength of light to be detected. For example, the incident surface plate 28 may be quartz. The stem 9 is constituted by a material such as copper that does not have light-transmitting property. Accordingly, a light incident part in the electron tube 1 is only the light incident hole 26 provided with the incident surface plate 28. A light-shielding part 10 with respect to light emitted from the stem 9 side includes a side wall region that connects the periphery of the light incident hole 26, and the base main surface 22 and the base rear surface 23. Note that, specifically, the periphery of the light incident hole 26 is a region excluding the outer opening 26b in the base rear surface 23. An inner wall surface of the light incident hole 26 and the base main surface 22 are also light-shielded. Accordingly, light incident from the incident surface plate 28 is not transmitted through the base 17 of the stem 9 and is not incident to the inside of the casing 2. Note that, the stem 9 may be constituted by a material that does not have a light-transmitting property, or may be constituted by a material that has the light-transmitting property. In a case where the stem 9 is constituted by the material having the light-transmitting property, a light-shielding member may be formed in the side wall region that connects the periphery of the light incident hole 26, and the base main surface 22 and the base rear surface 23. In addition, a light-shielding treatment may be performed with respect to the periphery of the light incident hole 26 and the side wall region. In addition, a light-shielding member may be formed on the inner wall surface of the light incident hole 26 and the base main surface 22, or the light-shielding treatment may be performed with respect to the inner wall surface of the light incident hole 26 and the base main surface 22.

The incident surface plate 28 includes a light incident surface 28a and a light emission surface 28b. The light incident surface 28a is exposed to the outside of the casing 2. The light emission surface 28b includes a portion that is exposed to the inside of the casing 2. A peripheral edge portion of the light emission surface 28b is fixed to the counter bore 27. The light incident surface 28a of the incident surface plate 28 is orthogonal to the axial line A1.

The power supply pin 18 applies a voltage to the substrate 24 to which the avalanche photodiode 6 is attached. The power supply pin 18 is disposed in a region that is located between the connection region 22a and the diode disposing region 22b and does not overlap the through-hole formed region 22c. The power supply pin 18 is a rod-shaped conductive member that extends in parallel to the axial line A2. One end of the power supply pin 18 is exposed to the outside of the casing 2. The other end of the power supply pin 18 is exposed to the inside of the casing 2. One end of a wire 29 is connected to the other end of the power supply pin 18. The other end of the wire 29 is connected to the substrate 24 to which the avalanche photodiode 6 is attached. The power supply pin 18 is insulated from the stein 9 by an insulating structure (not illustrated).

The signal pin 19 extracts a signal from the avalanche photodiode 6. The signal pin 19 is disposed in the diode disposing region 22b. As in the power supply pin 18, the signal pin 19 is also a rod-shaped conductive member that extends in parallel to the axial line A2. One end of the signal pin 19 is exposed to the outside of the casing 2. The other end of the signal pin 19 is exposed to the base main surface 22 of the base 17. The other end of the signal pin 19 is connected to the avalanche photodiode 6 through the substrate 24. The signal pin 19 is insulated from the stem 9 by an insulating structure (not illustrated).

The pin protecting tube part 21 as an SMA connector protects the other end of the signal pin 19. The pin protecting tube part 21 is a tubular portion and is provided at an approximately center of the base rear surface 23. An inner diameter D21 of the pin protecting tube part 21 is greater than an outer diameter D19 of the signal pin 19. A height of the pin protecting tube part 21 is longer than a length of the signal pin 19 that protrudes from the base rear surface 23. Note that, the height of the pin protecting tube part 21 is a length from the base rear surface 23 to a tip end 21a of the pin protecting tube part 21.

Figure 3:
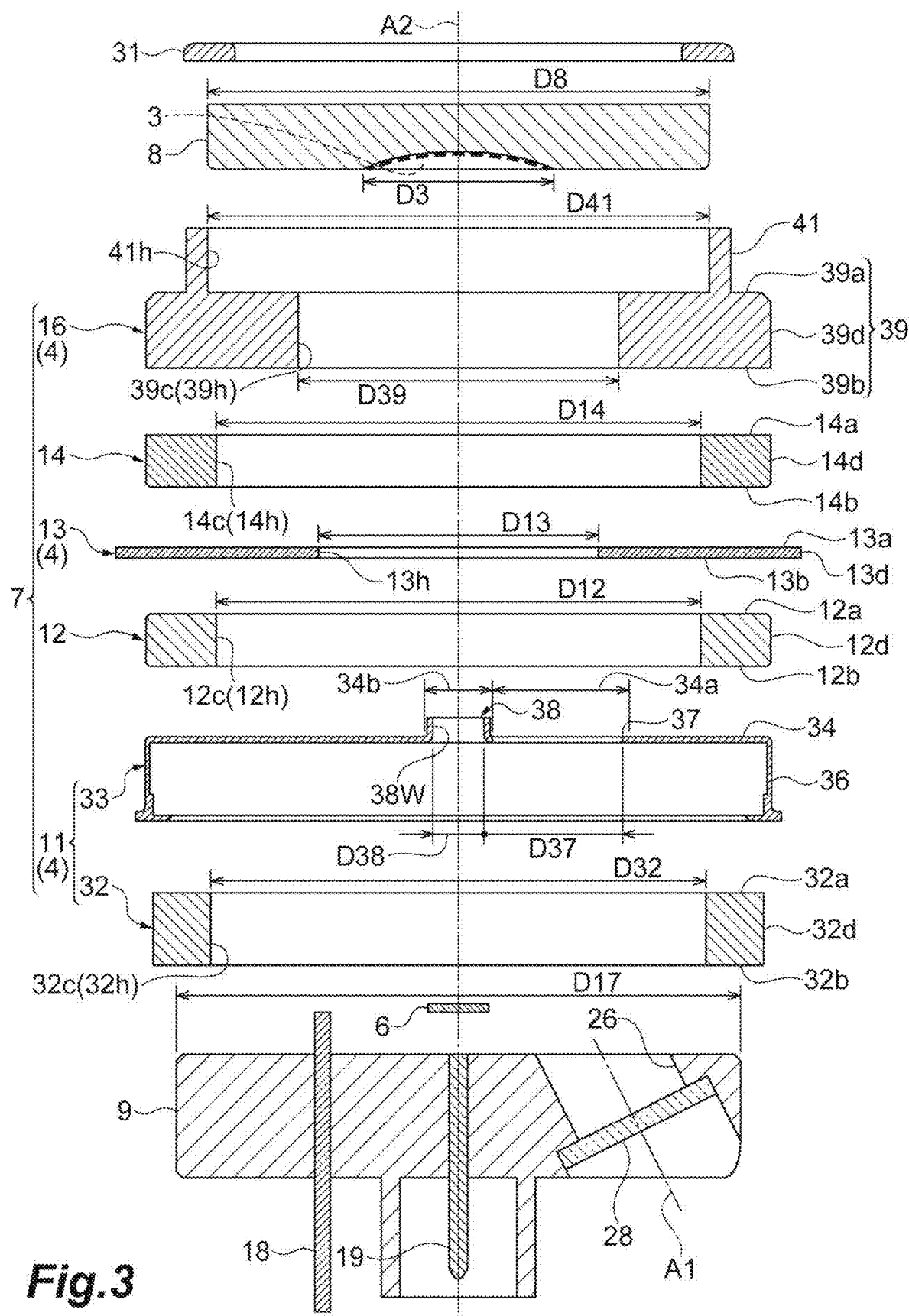
FIG. 3 is an exploded view illustrating the cross-section of the electron tube.

A structure of the side tube part 7 will be described in more detail with reference to FIG. 3. The side tube part 7 includes the lower electrode part 11, the lower insulating tube part 12, the intermediate electrode part 13, the upper insulating tube part 14, and the upper electrode part 16.

The lower electrode part 11 includes a lower electrode base body part 32 and an electrode cover 33. The lower electrode part 11 functions as the focusing electrode part 4 that is closest to the avalanche photodiode 6. The lower electrode base body part 32 is a conductive member having an annular shape. As an example, a voltage of 8 kV is applied to the lower electrode base body part 32 from a power supply (not illustrated) that is electrically connected to the lower electrode base body part 32. The lower electrode base body part 32 includes an upper surface 32a, a lower surface 32b, an inner peripheral surface 32c that forms a though-hole 32h, and an outer peripheral surface 32d. The electrode cover 33 is a conductive member having an approximately cap shape. The electrode cover 33 includes a flat plate-shaped focusing electrode part 34 (electrode plate) that faces the photoelectric surface 3 and the avalanche photodiode 6, and a cover wall portion 36 that is provided to be erected from an outer peripheral portion of the focusing electrode part 34. The focusing electrode part 34 and the cover wall portion 36 are integrally formed. The electrode cover 33 is disposed between the lower electrode base body part 32 and the lower insulating tube part 12. The focusing electrode part 34 of the electrode cover 33 is interposed between the upper surface 32a of the lower electrode base body part 32 and a lower surface 12b of the lower insulating tube part 12. The cover wall portion 36 that is provided to be erected from the outer peripheral portion of the focusing electrode part 34 covers the outer peripheral surface 32d of the lower electrode base body part 32.

The lower electrode part 11 includes a light passage hole 37 (light passage portion), an electron passage hole 38 (electron passage portion), and a wall portion 38W. The lower electrode part 11 includes the light passage hole 37 and the electron passage hole 38 which are through-holes. The light passage hole 37 and the electron passage hole 38 are formed to be adjacent to each other and to be spaced away from each other in a flat plate portion of the focusing electrode part 34 of the electrode cover 33. The wall portion 38W is erectly provided to surround the electron passage hole 38. A through-hole provided in the focusing electrode part 34 includes only the light passage hole 37 and the electron passage hole 38. The light passage hole 37 guides light received from the light incident hole 26 to the photoelectric surface 3. The size of the light passage hole 37 is equal to or less than a size when projecting the light incident hole 26 to the focusing electrode part 34 along the axial line A1. In this embodiment, the size of the light passage hole 37 is approximately the same as the size when projecting the light incident hole 26 to the focusing electrode part 34 along the axial line A1. The light passage hole 37 is provided in the flat plate portion of the focusing electrode part 34 to be spaced away from the electron passage hole 38 through the wall portion 38W. Accordingly, the light passage hole 37 does not influence an electric field acting on focusing of electrons. A peripheral portion of the light passage hole 37 is light-shielded by the focusing electrode part 34. The electron passage hole 38 guides electrons emitted from the photoelectric surface 3 to the avalanche photodiode 6 while focusing the electrons. The light passage hole 37 is provided in a first region 34a (refer to FIG. 1) in the focusing electrode part 34. The electron passage hole 38 is provided in a second region 34b (refer to FIG. 1) in the focusing electrode part 34. The electron passage hole 38 is formed by the wall portion 38W that is erected toward the photoelectric surface 3 along a direction of the axial line A2. A height of the wall portion 38W is set to a height with which a light route reaching the photoelectric surface 3 after passing through the light passage hole 37 along the axial line A1 is not hindered. The wall portion 38W does not intersect at least the axial line A1. The first region 34a includes a point that intersects the axial line A1 (refer to FIG. 1). Accordingly, the first region 34a is formed on the axial line A1. The second region 34b includes a point that intersects the axial line A2. Accordingly, the second region 34b is formed on the axial line A2. The light passage portion may have an arbitrary configuration as long as light is transmitted. Accordingly, the light passage portion is not limited to a through-hole such as the light passage hole 37.

The lower insulating tube part 12 is an insulating member having an annular shape. For example, the lower insulating tube part 12 is constituted by a ceramic material. The lower insulating tube part 12 electrically insulates the lower electrode part 11 and the intermediate electrode part 13. The lower insulating tube part 12 is a spacer that maintains a physical distance between the lower electrode part 11 and the intermediate electrode part 13. The lower insulating tube part 12 includes an upper surface 12a, a lower surface 12b, an inner peripheral surface 12e that forms a through-hole 12h, and an outer peripheral surface 12d.

The intermediate electrode part 13 is a conductive member having a disc shape. The intermediate electrode part 13 functions as the focusing electrode part 4 at an intermediate portion. The intermediate electrode part 13 is disposed between the lower insulating tube part 12 and the upper insulating tube part 14. As an example, a voltage of 4 kV is applied to the intermediate electrode part 13 from the power supply (not illustrated) that is electrically connected to the intermediate electrode part 13. The intermediate electrode part 13 includes an upper surface 13a, a lower surface 13b, a through-hole 13h provided at the center, and an outer peripheral surface 13d. An inner diameter D13 of the through-hole 13h is smaller than an inner diameter of the casing 2. The inner diameter D13 of the through-hole 13h is greater than an inner diameter D38 of the electron passage hole 38.

The upper insulating tube part 14 is an insulating member having an annular shape. For example, the upper insulating tube part 14 is constituted by a ceramic material. Accordingly, an elementary configuration of the upper insulating tube part 14 is the same as in the lower insulating tube part 12. The upper insulating tube part 14 electrically insulates the intermediate electrode part 13 and the upper electrode part 16. The upper insulating tube part 14 is a spacer that maintains a physical distance between the intermediate electrode part 13 and the upper electrode part 16. The upper insulating tube part 14 includes an upper surface 14*a*, a lower surface 14*b*, an inner peripheral surface 14*c* that forms a through-hole 14*h*, and an outer peripheral surface 14*d*.

The upper electrode part 16 is a conductive member having a shape in which an upper electrode main body 39 and an erecting portion 41 are integrally formed. The upper electrode part 16 functions as the focusing electrode part 4 that is closest to the photoelectric surface 3. As an example, a voltage (ground potential) of 0 V is applied to the upper electrode part 16 that is a cathode electrode from the power supply (not illustrated) that is electrically connected to the upper electrode part 16. The upper electrode main body 39 has an annular shape. The upper electrode main body 39 includes an upper surface 39*a*, a lower surface 39*b*, an inner peripheral surface 39*c* that forms a through-hole 39*h*, and an outer peripheral surface 39*d*. An inner diameter D39 of the through-hole 39*h* is smaller than the inner diameter of the casing 2. The inner diameter D39 of the through-hole 39*h* is smaller than an inner diameter D14 of the upper insulating tube part 14. In addition, the inner diameter D39 is smaller than an inner diameter D12 of the lower insulating tube part 12. In addition, the inner diameter D39 is smaller than an inner diameter D32 of the lower electrode base body part 32 in the lower electrode part 11. On the other hand, the inner diameter D39 of the through-hole 39*h* is greater than the inner diameter D38 of the electron passage hole 38. In addition, the inner diameter D39 is greater than the inner diameter D13 of the through-hole 13*h* of the intermediate electrode part 13. In addition, the inner diameter D39 is greater than a diameter D3 of the photoelectric surface 3.

Electrons sequentially pass through the through-hole 39*h* of the upper electrode part 16, the through-hole 13*h* of the intermediate electrode part 13, and the electron passage hole 38 of the lower electrode part 11, and reach the avalanche photodiode 6 from the photoelectric surface 3. A central axial line of the through-holes 39*h* and 13*h*, and the electron passage hole 38 overlaps the axial line A2. The inner diameters D39, D13, and D38 of the through-holes 39*h* and 13*h*, and the electron passage hole 38 gradually decrease along a propagation direction of the electrons. The inner diameter D39 is the largest. The inner diameter D13 is smaller than the inner diameter D39 but is greater than the inner diameter D38. The inner diameter D38 is the smallest. The most important fact is in that the inner diameter D38 of the electron passage hole 38 closest to the avalanche photodiode 6 is the smallest among the inner diameter D39 of the through-hole 39*h*, the inner diameter D13 of the through-hole 13*h*, and the inner diameter D38 of the electron passage hole 38. A magnitude relationship between the inner diameter D39 of the through-hole 39*h* and the inner diameter D13 of the through-hole 13*h* can be appropriately changed. For example, the inner diameter D39 of the through-hole 39*h* may be greater than the inner diameter D13 of the through-hole 13*h*. In addition, the inner diameter D39 of the through-hole 39*h* may be smaller than the inner diameter D13 of the through-hole 13*h*.

The lower surface 39*b* of the upper electrode main body 39 is fixed to the upper surface 14*a* of the upper insulating tube part 14. An erecting portion 41 is provided on the upper surface 39*a* of the upper electrode main body 39. The erecting portion 41 has an annular shape. An inner diameter D41 of the erecting portion 41 is greater than the inner diameter D39 of the upper electrode main body 39. Accordingly, the upper electrode part 16 includes a region that is surrounded by an inner peripheral surface of the erecting portion 41 and the upper surface of the upper electrode main body 39. The lid 8 is inserted into the region.

Figure 4:
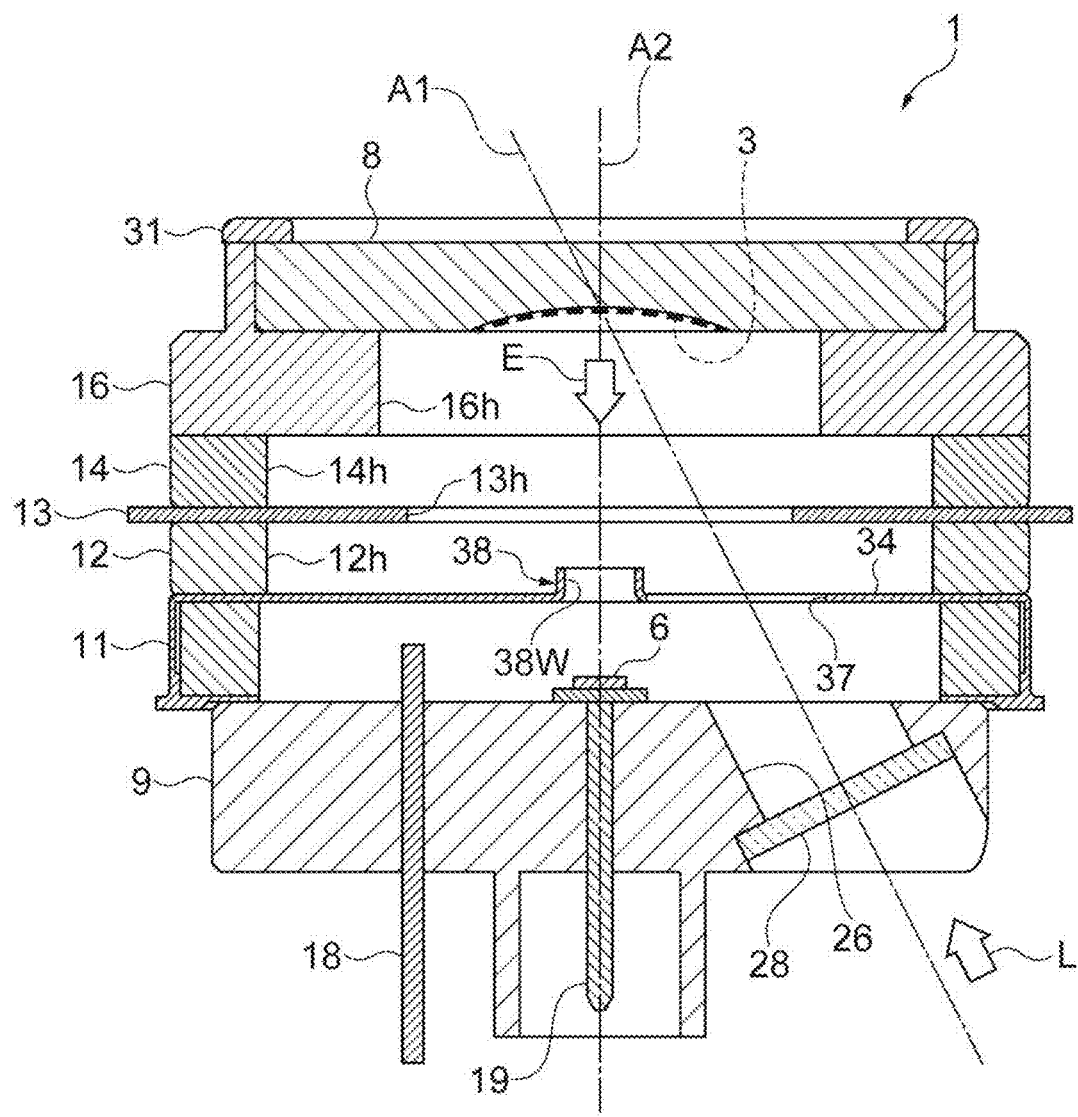
FIG. 4 is a view illustrating a cross-section of the electron tube according to the embodiment.

Here, a detailed configuration of the electron tube 1 according to this embodiment will be described with reference to FIG. 4.

The electron tube 1 includes the axial lines A1 and A2. The axial line A1 is a straight line that connects the light incident hole 26 and the photoelectric surface 3. More specifically, the axial line A1 is a central axial line of the light incident hole 26. In addition, the axial line A1 passes through the center of the photoelectric surface 3. The axial line A2 is a straight line that connects the photoelectric surface 3 and the avalanche photodiode 6. More specifically, the axial line A2 is a straight line that connects the center of the photoelectric surface 3 and the center of the avalanche photodiode 6. The axial line A2 is a central axial line of the casing 2. The axial line A1 is inclined with respect to the axial line A2. For example, the axial line A1 intersects the axial line A2 on the photoelectric surface 3.

Light L emitted from the stem 9 side is incident to the inside of the casing 2 from the light incident hole 26.

Note that, the light L emitted to the stem 9 is shielded. Next, the light L propagates between the stem 9 and the focusing electrode part 34 of the lower electrode part 11. Next, the light L passes through the light passage hole 37. Next, the light L propagates between the lower electrode part 11 and the intermediate electrode part 13. Next, the light L passes through the through-hole 13*h* of the intermediate electrode part 13. Next, the light L propagates between the intermediate electrode part 13 and the upper electrode part 16. Next, the light L passes through the through-hole 16*h* of the upper electrode part 16. Then, the light L reaches the photoelectric surface 3. That is, the light L reaches the photoelectric surface 3 only after passing through the light incident hole 26 and the light passage hole 37. Accordingly, a route of the light L that reaches the photoelectric surface 3 is limited.

Next, electrons E emitted from the photoelectric surface 3 are accelerated toward the avalanche photodiode 6 by an electric field formed by the focusing electrode part 34. The electrons E pass through the through-hole 16*h* of the upper electrode part 16. Next, the electrons E propagate between the upper electrode part 16 and the intermediate electrode part 13. Next, the electrons E pass through the through-hole 13*h* of the intermediate electrode part 13. Next, the electrons E propagate between the intermediate electrode part 13 and the lower electrode part 11. Next, the electrons E pass through the electron passage hole 38 of the lower electrode part 11. Then, the electrons E propagate between the lower electrode part 11 and the stem 9, and are incident to the avalanche photodiode 6. That is, the electrons E reaching the avalanche photodiode 6 pass through the electron passage hole 38. Accordingly, a route of the electrons E reaching the avalanche photodiode 6 from the photoelectric surface 3 is linear, and thus formation of the electric field for focusing is easy.

According to the electron tube 1, the light L is received into the casing 2 from the light incident hole 26 which is provided in the stem 9 and of which the periphery is light-shielded, and reaches the photoelectric surface 3 after passing through the light passage hole 37 of the intermediate electrode part 13. That is, incidence of light from the stem 9 is limited to incidence through the light incident hole 26. Light passed through the light incident hole 26 passes through the light passage hole 37. Accordingly, it is necessary for the light that finally reaches the photoelectric surface 3 to pass through the light passage hole 37. In this case, an aspect of the light L until reaching the photoelectric surface 3 after being incident from the stem 9 including the light incident hole 26 is limited to an aspect of passing through the light incident hole 26 and the light passage hole 37. As a result, a deviation of an incident route is suppressed. Accordingly, a distance until reaching the photoelectric surface 3 from the light incident hole 26 is in a predetermined range. In addition, the electrons E emitted from the photoelectric surface 3 are focused by the focusing electrode part 4. The focused electrons are guided to the avalanche photodiode 6. Accordingly, temporal fluctuation of a signal output from the avalanche photodiode 6 is reduced, and thus it is possible to reliably obtain desired temporal characteristics.

Hereinbefore, the invention has been described in detail on the basis of the embodiment. However, the invention is not limited to the above-described embodiment. Various modifications can be made in a range not departing from the gist of the invention.

MODIFICATION EXAMPLE 1

Figure 5:
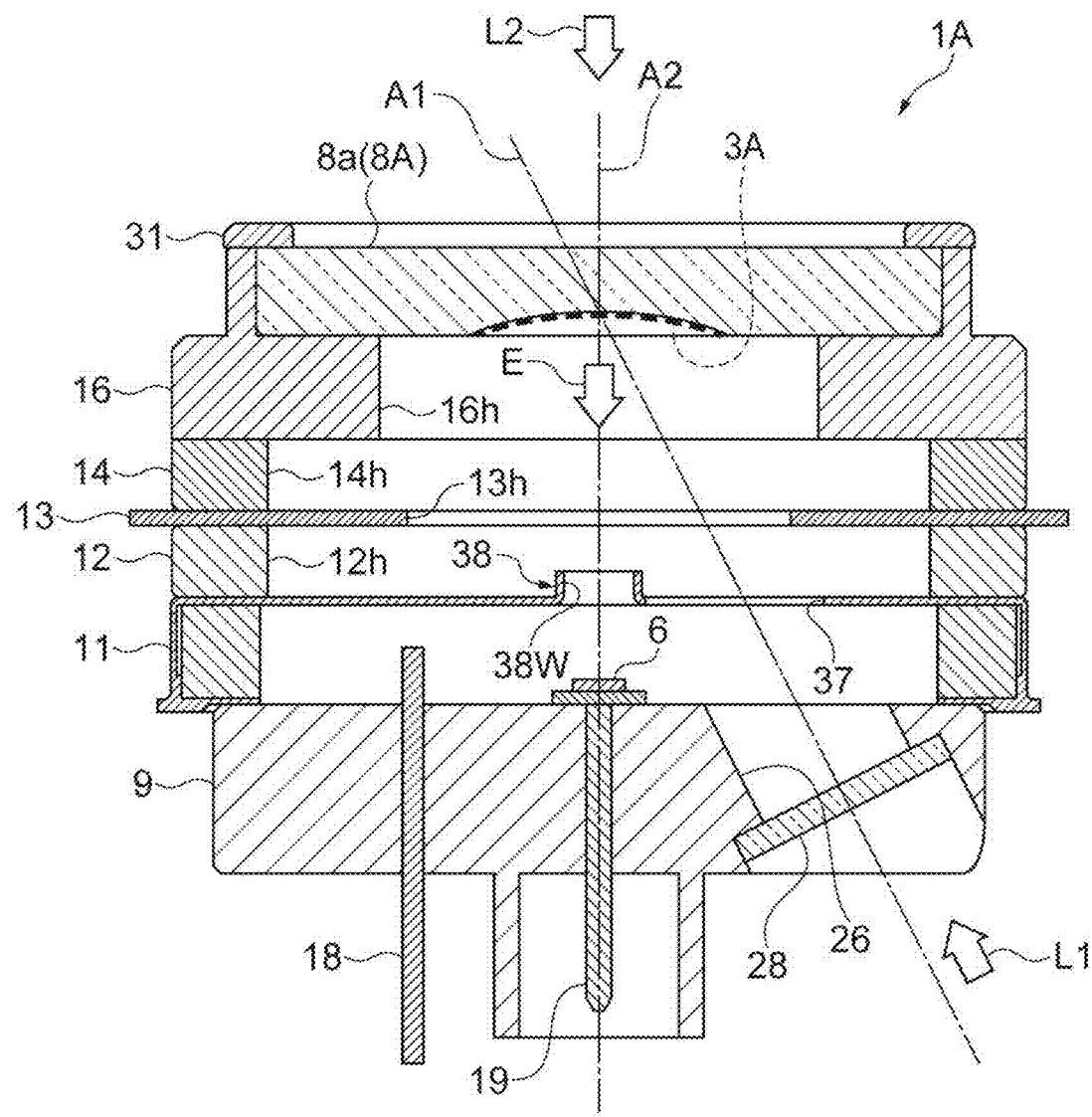
FIG. 5 is a view illustrating a cross-section of an electron tube according to Modification Example 1.

In the electron tube 1 according to the above-described embodiment, the lid 8 is a metal lid. However, the lid is not limited to the metal lid. As illustrated in FIG. 5, for example, a lid 8A of an electron tube 1A according to Modification Example 1 may be a glass lid. Examples of a glass material include sapphire glass. According to this configuration, light L2 can be received also from the lid 8A. A photoelectric surface 3A of the electron tube 1A is a reflection type photoelectric surface that receives light L1 from the light incident hole 26. In addition, the photoelectric surface 3A is a transmission type photoelectric surface that receives the light L2 from a lid upper surface 8a of the lid 8A.

MODIFICATION EXAMPLE 2

Figure 6:
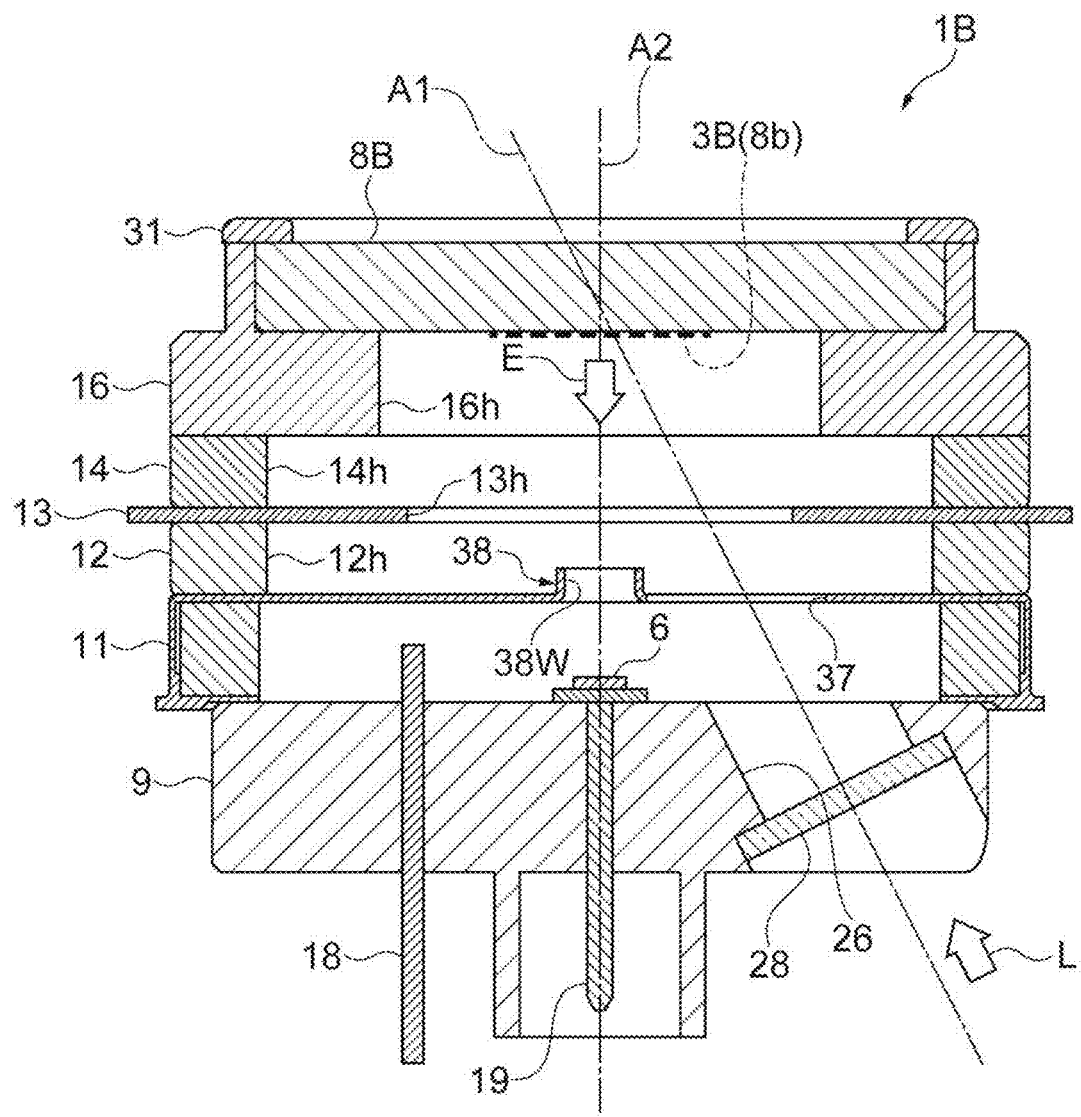
FIG. 6 is a view illustrating a cross-section of an electron tube according to Modification Example 2.

The photoelectric surface 3 of the electron tube 1 shows a curve surface such as a paraboloid. The photoelectric surface is not limited to the curved surface. As illustrated in FIG. 6, a photoelectric surface 3B of an electron tube 1B according to Modification Example 2 may have a planar shape provided along the lid lower surface 8b. For example, the photoelectric surface 3B is a crystalline photoelectric surface such as GaAsP. In this configuration, when the shape of the photoelectric surface 3B is the planar shape, it is possible to more easily perform fixing of a crystal in comparison to the curved surface.

MODIFICATION EXAMPLE 3

Figure 7:
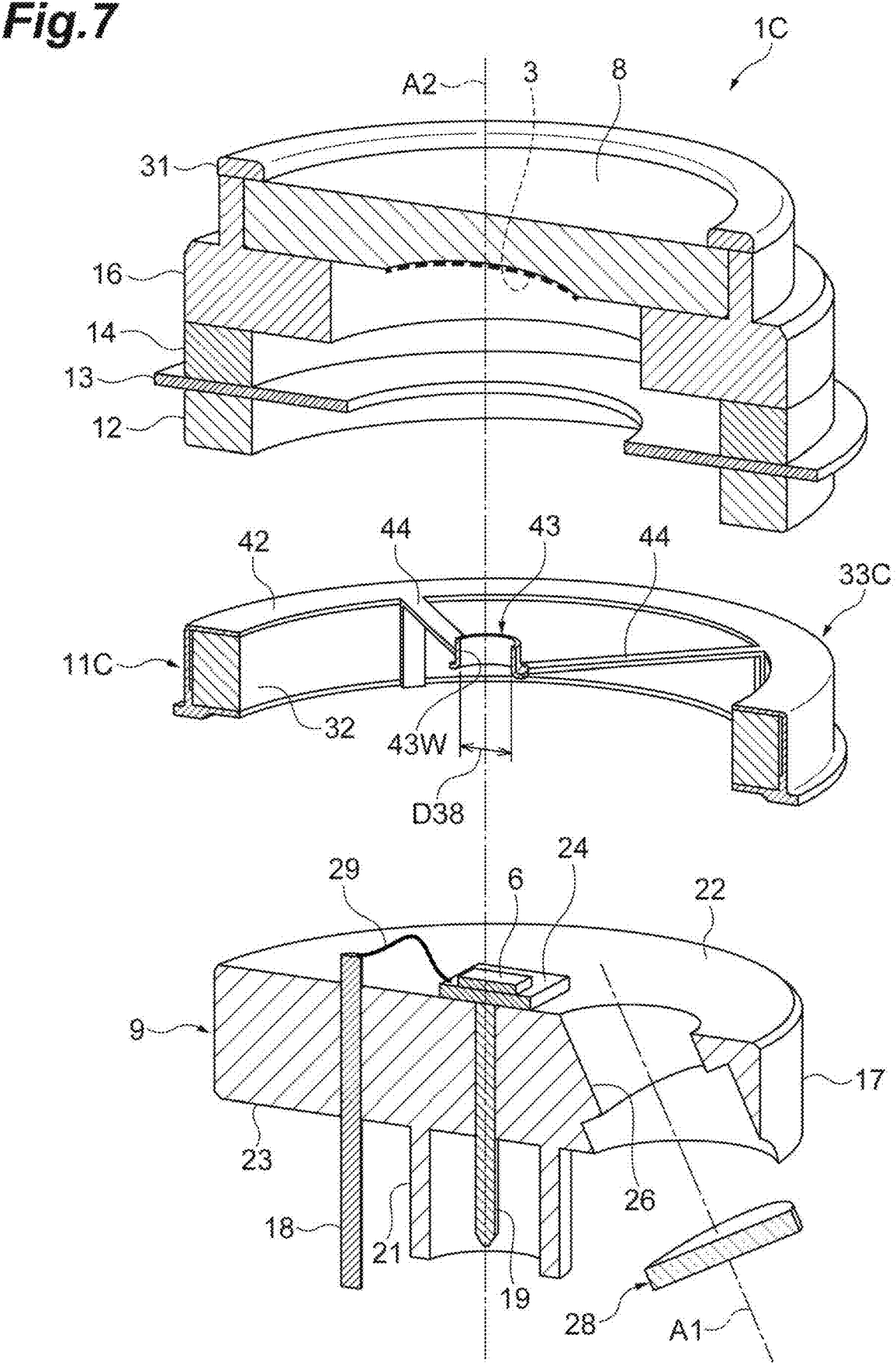
FIG. 7 is a perspective view illustrating a cross-section of an electron tube according to Modification Example 3.

In the electron tube 1, the electrode cover 33 of the intermediate electrode part 13 has an approximately flat plate shape. However, the electrode cover is not limited to the approximately flat plate shape. As illustrated in FIG. 7, an electrode cover 33C of a lower electrode part 11C provided in an electron tube 1C according to Modification Example 3 includes a cover frame 42, a focusing electrode part 43, and a plurality of frames 44 which support the focusing electrode part 43. Light passes through a gap (light passage portion) formed between the separate frames 44 and reaches the photoelectric surface 3. The focusing electrode part 43 is a tubular member having the same inner diameter D38 as in the electron passage hole 38. A central axial line of the focusing electrode part 43 overlaps the axial line A2. The focusing electrode part 43 is held by a plurality of (for example, four) frames 44. One end of each of the frames 44 is connected to the focusing electrode part 43. The other end of the frame 44 is connected to the cover frame 42. According to this configuration, it is possible to easily perform a degassing process performed during manufacturing of the electron tube 1C.

MODIFICATION EXAMPLE 4

Figure 8:
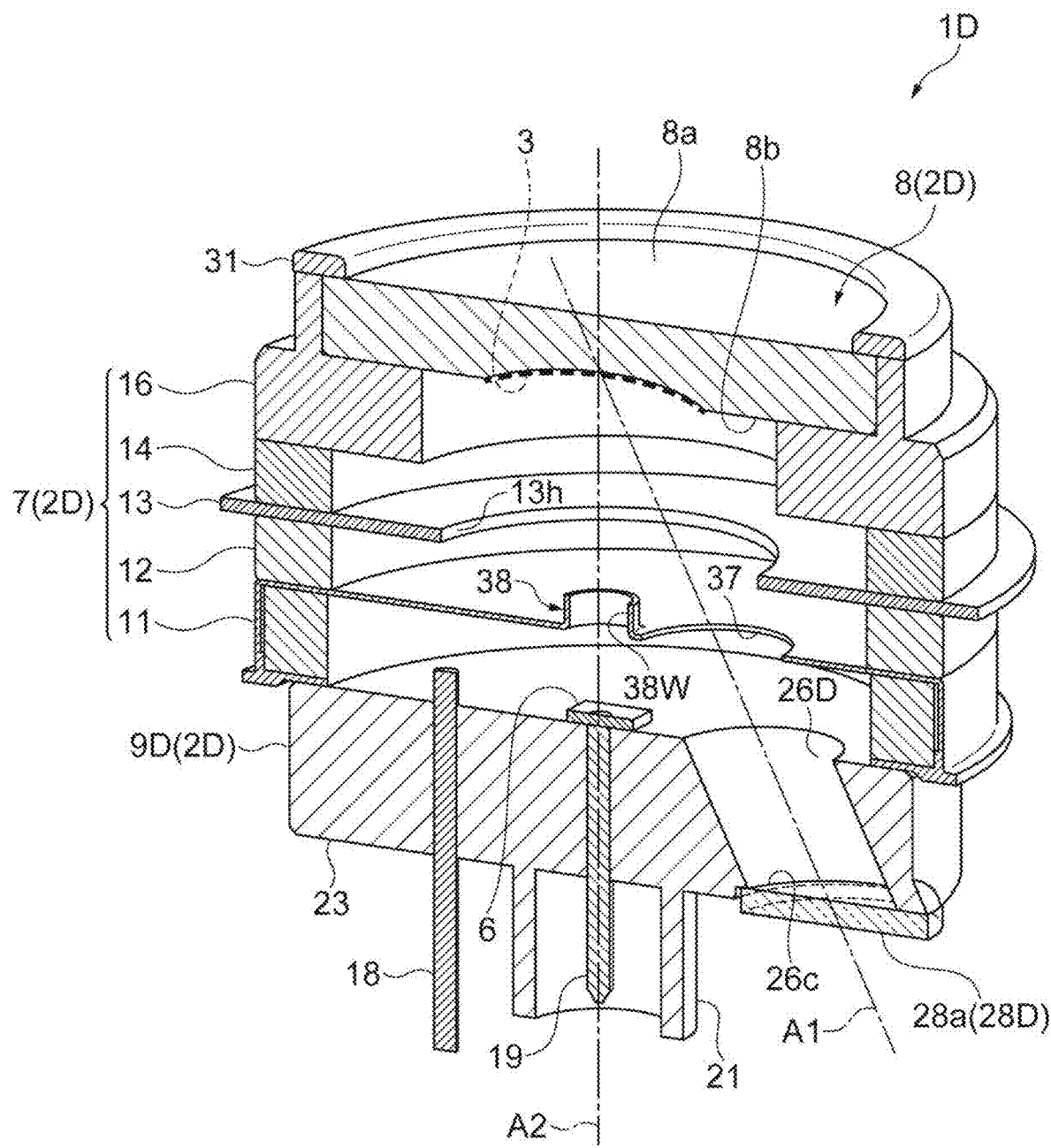
FIG. 8 is a perspective view illustrating a cross-section of an electron tube according to Modification Example 4.

The light incident surface 28a of the incident surface plate 28 of the electron tube 1 is orthogonal to the axial line A1. However, the configuration of the incident surface plate is not limited to this configuration. As illustrated in FIG. 8, in an incident surface plate 28D of an electron tube ID according to Modification Example 4, the light incident surface 28a may be inclined with respect to the axial line A1. Specifically, an outer opening 26c of a light incident hole 26D is provided in the base rear surface 23. A stem 9D that constitutes a casing 2D does not includes the counter bore 27 (refer to FIG. 1). The incident surface plate 28D is attached to the base rear surface 23 to air-tightly seal the outer opening 26c. The incident surface plate 28D can be easily fixed to the stem 9D. Note that, as a configuration for receiving light, the entirety of the stem 9D may be formed from a light-transmitting material instead of a through-hole as the light incident hole. In a case where the entirety of the stem 9D is formed from the light-transmitting material, a light-shielding member is formed in a region except for regions corresponding to an inner opening and an outer opening in the light incident hole 26D. In addition, a light-shielding treatment may be performed to the region. According to the configuration, a light incident route that substantially corresponds to the light incident hole is formed.

MODIFICATION EXAMPLE 5

Figure 9:
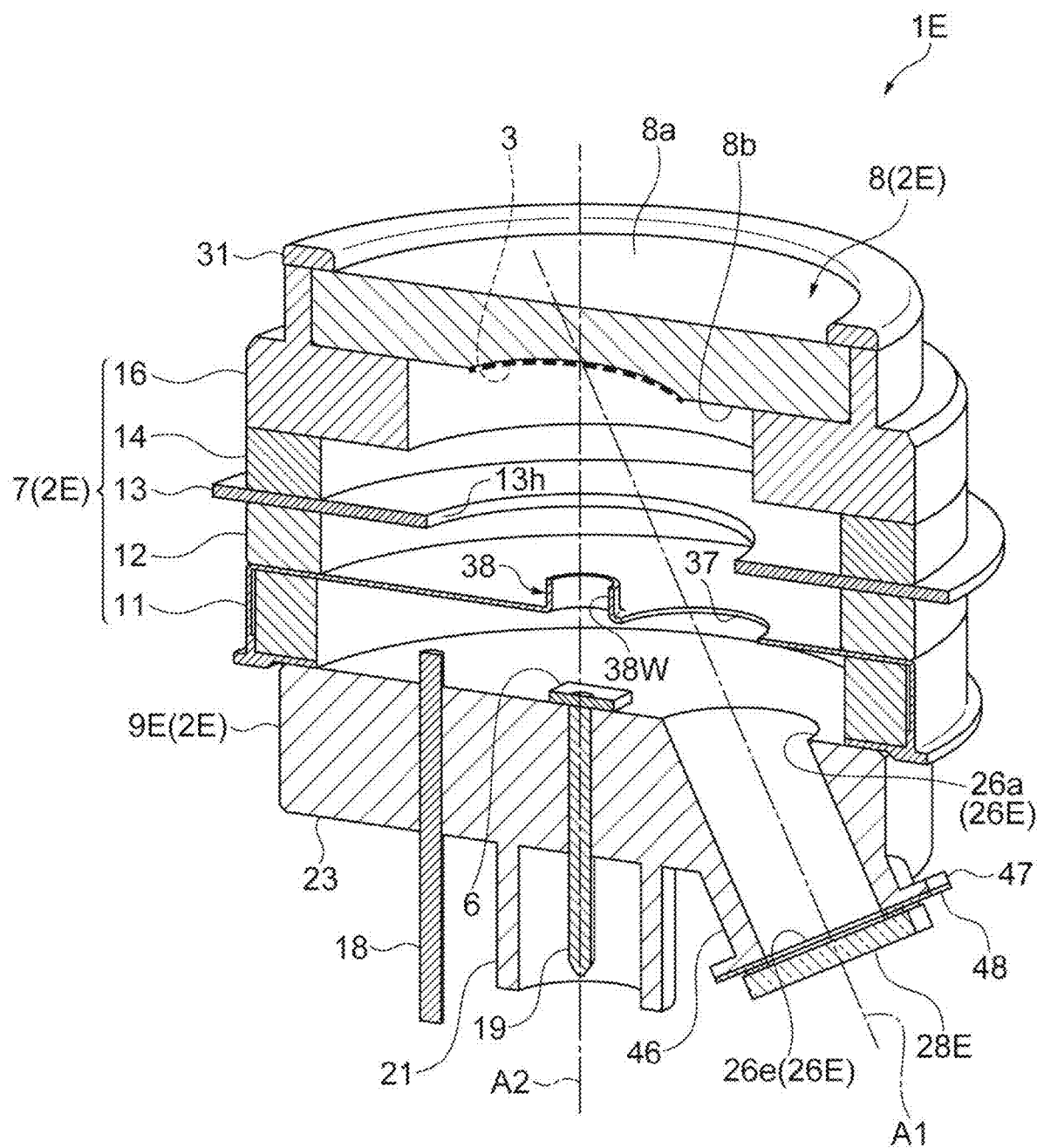
FIG. 9 is a perspective view illustrating a cross-section of an electron tube according to Modification Example 5.

In the electron tube 1, the stem 9 includes the counter bore 27, and the incident surface plate 28 is inserted with respect to the counter bore 27. However, the configuration of the stem is not limited to this configuration. As illustrated in FIG. 9, a stern 9E of an electron tube 1E according to Modification Example 5 includes a tube part 46 that constitutes a light incident hole 26E. Specifically, the light incident hole 26E includes an inner opening 26a and an outer opening 26e. The outer opening 26e is provided in a tip end of the tube part 46 that protrudes from the base rear surface 23 toward an external direction of the casing 2 along the axial line A1. An incident surface plate 28E is attached to a flange 47 provided in the tip end of the tube part 46 to air-tightly seal the outer opening 26e. The incident surface plate 28E is formed from quartz. According to the incident surface plate 28E formed from quartz, it is possible to allow light such as ultraviolet light having a short wavelength to be appropriately transmitted through the incident surface plate 28E. An aluminum seal is used to join the quartz incident surface plate 28E to the flange 47. A joining structure in which an aluminum ring 48 is inserted between the incident surface plate 28E and the flange 47 is attained. In the case of performing aluminum sealing, the incident surface plate 28E is pressed against the flange 47 at a predetermined pressure in a state in which the aluminum ring 48 is interposed therebetween so as to attach the incident surface plate 28E to the stem 9E. According to the electron tube 1E according to Modification Example 5, the tube part 46 protrudes. As a result, it is possible to easily perform a process of pressing the incident surface plate 28E against the flange 47. A light incident position with respect to the electron tube 1E protrudes from the stern 9E. Accordingly, it is possible to easily perform coupling with an external optical system that emits light to the incident surface plate 28E.

MODIFICATION EXAMPLE 6

Figure 10:
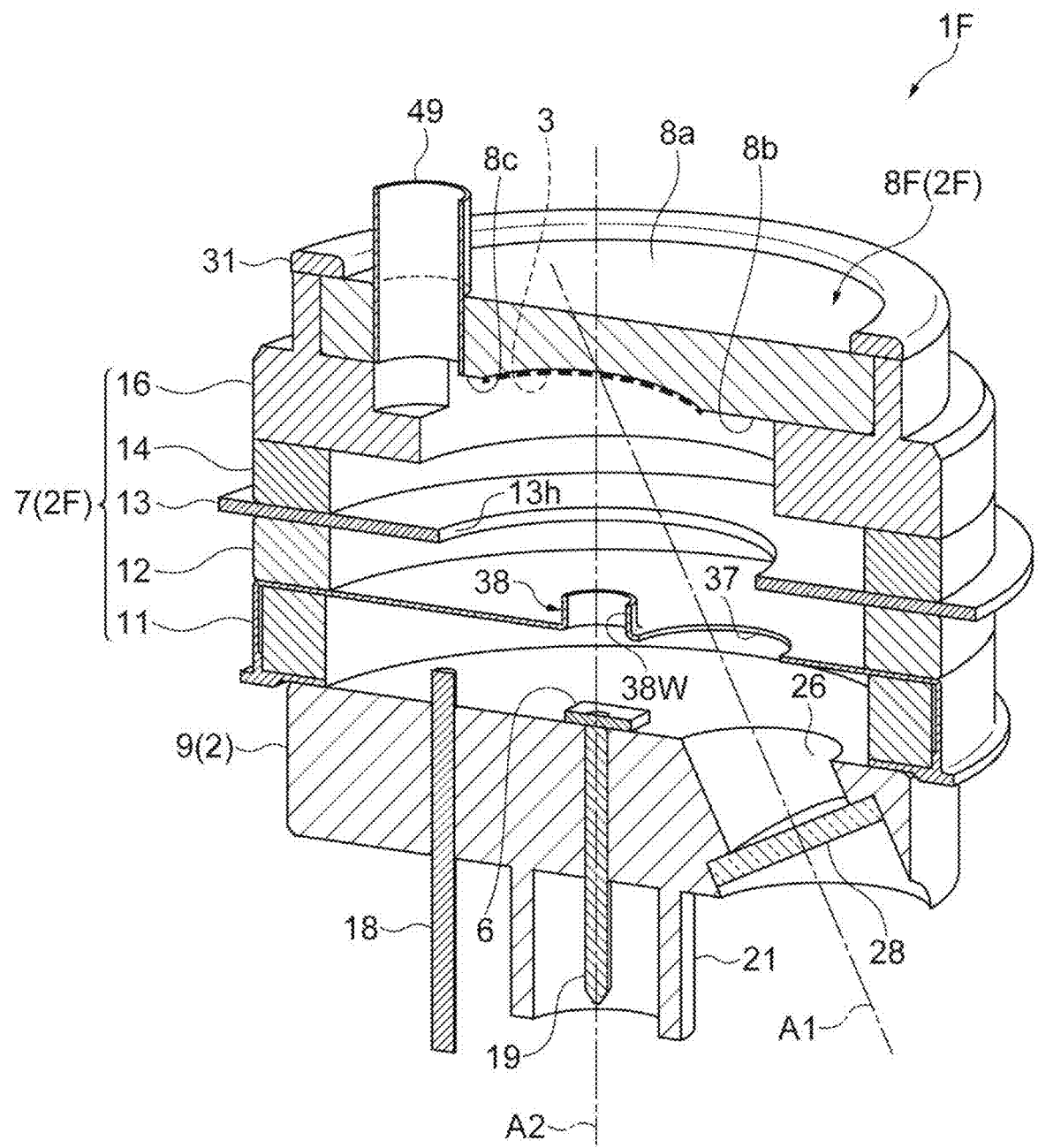
FIG. 10 is a perspective view illustrating a cross-section of an electron tube according to Modification Example 6.

As illustrated in FIG. 10, a lid 8F of an electron tube 1F according to Modification Example 6 may include an evacuation hole 8c. The evacuation hole 8c passes from a lid upper surface 8a of the lid 8F to a lid lower surface 8b of the lid 8F. An evacuation pipe 49 is air-tightly inserted into the evacuation hole 8c. A lower end of the evacuation pipe 49 matches the lid lower surface 8b of the lid 8F. Alternatively, the lower end of the evacuation pipe 49 may be disposed within the evacuation hole 8c and may not protrude from at least the lid lower surface 8b. An upper end of the evacuation pipe 49 protrudes upward in comparison to the lid upper surface 8a of the lid 8F and is sealed.

The evacuation pipe 49 may be formed in the lid 8 instead of the stem 9. The light incident hole 26, the incident surface plate 28, the power supply pin 18, the signal pin 19, and the like are disposed in the stem 9. Accordingly, there is a limitation to a location at which the evacuation pipe 49 can be provided. In the case of providing the evacuation pipe 49 in the stem 9, during evacuation work, air that exists in an upper region in comparison to the intermediate electrode part 13 moves to the stem 9 side through the electron passage hole 38 and the light passage hole 37 of the intermediate electrode part 13, and is evacuated. Accordingly, there is a possibility that the focusing electrode part 4 may be resistant against the evacuation. On the other hand, according to the configuration in which the evacuation pipe 49 is provided in the lid 8F, it is not necessary to consider the incidence of light. In addition, a constituent element such as the power supply pin 18 does not protrude, and thus the degree of freedom of the providing location is also high. Furthermore, there is an advantage in that the evacuation work is easily performed. In addition, it is possible to employ a typical evacuation process. Accordingly, manufacturing can be performed without using a transfer device. As a result, it is possible to reduce the manufacturing cost.

Even in any of the above-described examples, the avalanche photodiode 6 is used in the electron detection part. However, another semiconductor electron detection element may be used in the electron detection part without limitation to the avalanche photodiode 6. As the electron detection part, an electron detection part including a simple anode, a dynode, and an anode may be used without limitation to the semiconductor electron detection element.

REFERENCE SIGNS LIST

1, 1A, 1B, 1C, 1D, 1E, 1F: electron tube, 2, 2D: casing, 3, 3A, 3B: photoelectric surface (photoelectric conversion part), 4: focusing electrode part, 6: avalanche photodiode (electron detection part), 7: side tube part, 8, 8A, 8F: lid (lid part), 8a: lid upper surface, 8b: lid lower surface, 8c: evacuation hole, 9, 9D, 9E: stem (stem part), 10: light-shielding part, 11, 11C: lower electrode part, 12: lower insulating tube part, 13: intermediate electrode part, 14: upper insulating tube part, 16: upper electrode part, 17: base, 18: power supply pin, 19: signal pin, 21: pin protecting tube part, 22: base main surface, 22a: connection region, 22b: diode disposing region, 22c: through-hole formed region, 23: base rear surface, 24: substrate, 26, 26D, 26E: light incident hole (light incident window portion, through-hole), 28, 28D, 28E: incident surface plate (light-transmitting member), 28a: light incident surface, 29: wire, 31: sealing part, 32: lower electrode base body part, 33, 33C: electrode cover, 34: focusing electrode part (electrode plate), 34a: first region, 34b: second region, 36: cover wall portion, 37: light passage hole (light passage portion), 38: electron passage hole (electron passage portion), 38W: wall portion, 39: upper electrode main body, 41: erecting portion, 46: tube part, 47: flange, 48: aluminum ring, 49: evacuation pipe, 42: cover frame, 43: focusing electrode part, 44: frame, A1: axial line (first axial line), A2: axial line (second axial line), E: electron, L, L1, L2: light.

The invention claimed is:

1. An electron tube comprising:
    a photoelectric conversion part that emits electrons corresponding to incident light;
    an electron detection part that is disposed to face the photoelectric conversion part, and receives the electrons;
    a focusing electrode part that includes an electrode plate disposed between the photoelectric conversion part and the electron detection part, and accelerates and focuses the electrons from the photoelectric conversion part toward the electron detection part; and
    a casing that includes a stem part provided with the electron detection part, and forms an internal space in which the photoelectric conversion part and the electron detection part are disposed and which is maintained in a vacuum,
    wherein the stem part is provided with a light incident window portion through which the light is transmitted, and includes a light-shielding part that light-shields the periphery of the light incident window portion,
    the electrode plate includes a first region provided with a light passage portion that guides the light to the photoelectric conversion part by allowing the light guided from the light incident window portion to be transmitted, and a second region provided with an electron passage portion that guides the electrons to the electron detection part by allowing the electrons emitted from the photoelectric conversion part to be transmitted,
    the first region is formed on a first axial line that connects the light incident window portion and the photoelectric conversion part, and
    the second region is formed on a second axial line that connects the photoelectric conversion part and the electron detection part.

2. The electron tube according to claim 1,
    wherein the light passage portion is spaced away from the electron passage portion.

3. The electron tube according to claim 1,
    wherein the casing further includes a lid part that faces the stem part, and
    the lid part includes the photoelectric conversion part that is provided on a surface that faces the stem part and is exposed to the internal space.

4. The electron tube according to claim 1,
    wherein the light incident window portion includes a through-hole that is provided in the stem part in which the first axial line is set as a central axial line, and a light-transmitting member that is fixed to the stem part to close the through-hole.

5. The electron tube according to claim 4,
    wherein the light-transmitting member includes a light incident surface to which the light is incident, and the light incident surface is orthogonal to the first axial line.

6. The electron tube according to claim 1,
wherein the stem part is formed from a metal material.

7. The electron tube according to claim 3,
wherein the lid part is formed from a metal material.

* * * * *